Aug. 8, 1944.  L. S. WILLIAMS  2,355,350
PERCENTAGE INDICATING SCALE
Filed July 24, 1942   3 Sheets-Sheet 1
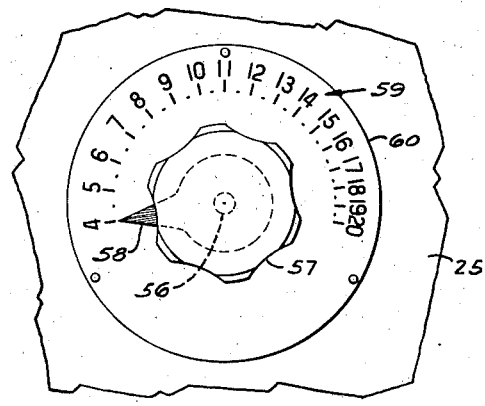
Fig. III
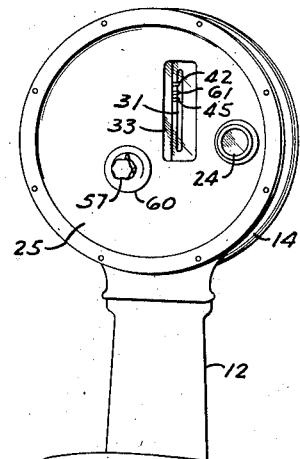
Fig. I
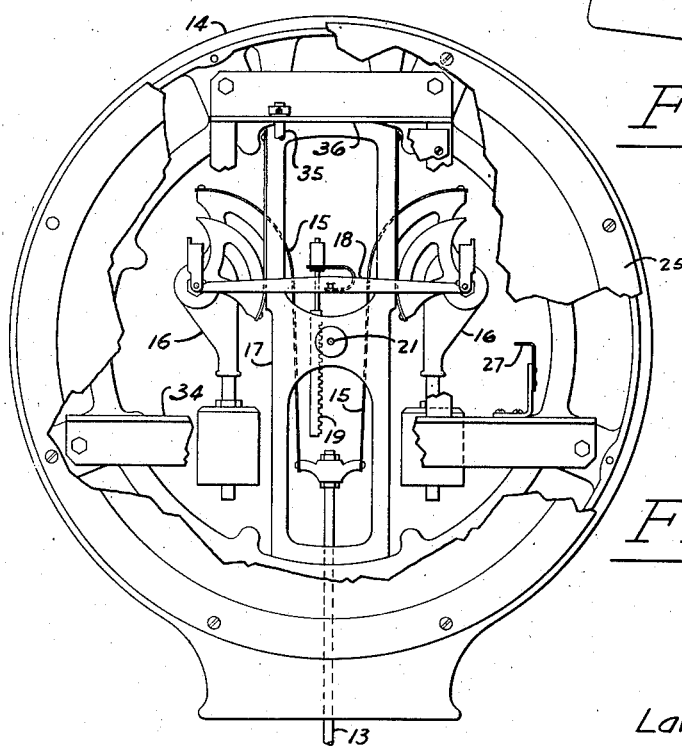
Fig. II
Lawrence S. Williams
INVENTOR
BY Marshall and Marshall
ATTORNEYS

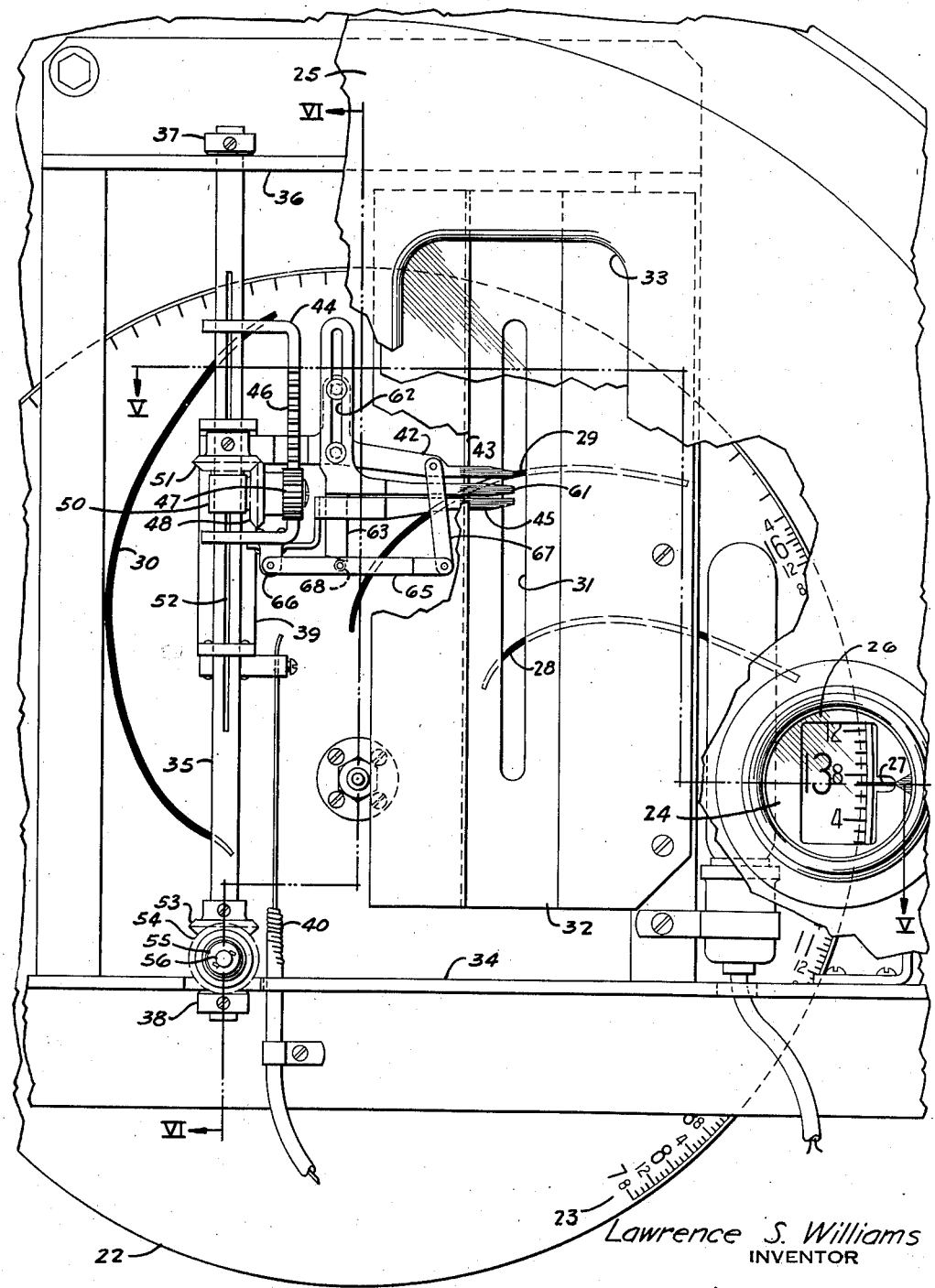

Aug. 8, 1944.  L. S. WILLIAMS  2,355,350
PERCENTAGE INDICATING SCALE
Filed July 24, 1942   3 Sheets-Sheet 3
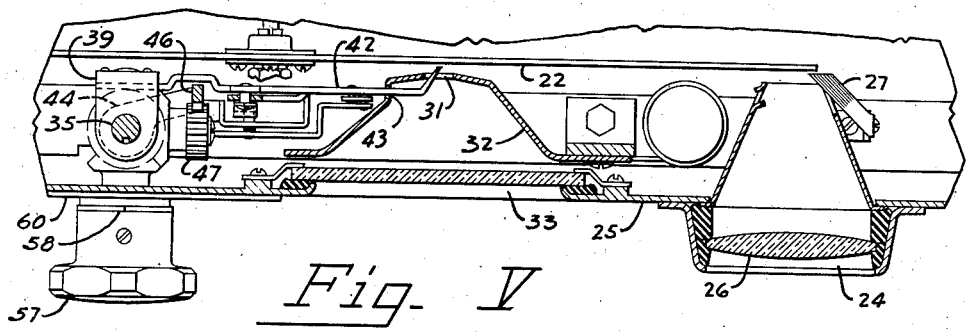
Fig. V
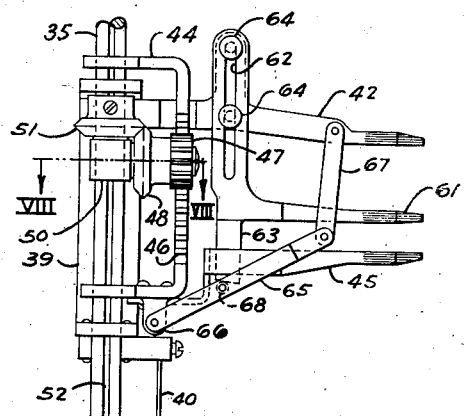
Fig. VII
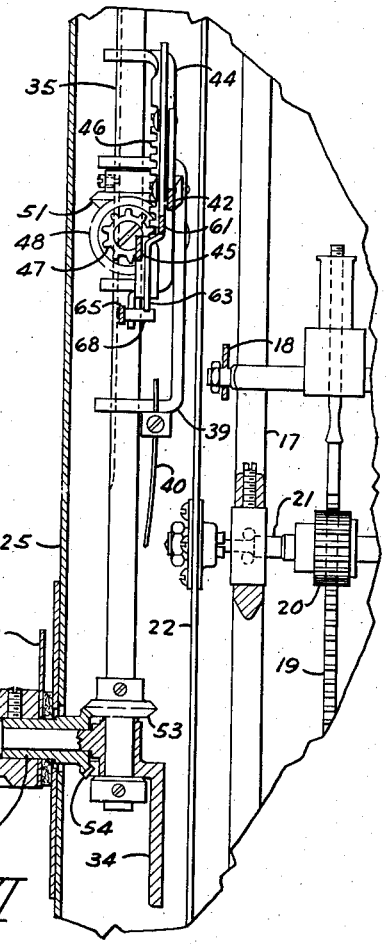
Fig. VI
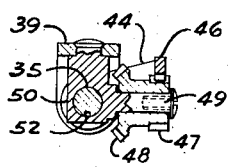
Fig. VIII
Lawrence S. Williams
INVENTOR
BY Marshall and Marshall
ATTORNEYS Patented Aug. 8, 1944

2,355,350

UNITED STATES PATENT OFFICE 2,355,350

PERCENTAGE INDICATING SCALE

Lawrence S. Williams, Toledo, Ohio, assignor to Toledo Scale Company, Toledo, Ohio, a corporation of New Jersey Application July 24, 1942, Serial No. 452,138

7 Claims. (Cl. 116—129)

This invention relates to percentage indicating scales, and in particular to scales employed to indicate when the weight of a commodity being processed has been varied by a predetermined percentage. The invention is particularly applicable to the type of percentage weighing scale disclosed and claimed in United States Letters Patent No. 2,208,556 issued to Marshall and Williams. In the weighing scale disclosed herein, and in the patent above mentioned, means are provided for setting a weighing scale to indicate when a predetermined percentage of brine by weight has been added to a ham being processed by the injection of brine into the blood vessels thereof.

In processing hams by this means a predetermined percentage by weight of brine is injected into the blood vessels, both to preserve and to flavor the ham. Since a weighing scale of the type disclosed in the above patent indicates the total amount of brine which should be injected, operators have been in the habit of injecting the entire quantity of brine into the main artery which branches and leads to both sides of the ham. However, it has been noted that the muscles on the flank side of the ham have a greater number of blood vessels in proportion to the amount of the flesh than do the muscles on the cushion side of the ham. If the curing fluid is evenly distributed between the two sides of the ham, a relatively greater amount will be dispersed through the flesh on the flank and an uneven flavor and cure will result.

It is an object of the present invention to provide means for indicating the correct amount of brine to be injected into the vessels leading to the cushion side of the ham and into the vessels leading to the flank side of the ham to compensate for the difference in volume of the two systems of blood vessels when the total amount of brine to be injected is a predetermined percentage of the weight of the ham being processed.

It is another object of this invention to provide means for proportioning brine being injected into a ham between the blood vessels leading to the cushion side and the flank side thereof in the correct proportion to compensate for the difference in volume regardless of the weight of the ham being processed or the total percentage by weight of the brine to the ham being injected.

More specific objects and advantages are apparent from the description, in which reference is had to the accompanying drawings illustrating a preferred form of scale embodying the invention.

In the drawings:

Fig. I is a view in perspective of a weighing scale embodying the invention.

Fig. II is a fragmentary view in elevation of load counterbalancing mechanism employed in the scale shown in Fig. I.

Fig. III is a greatly enlarged detailed view of a percentage indicator employed with the scale illustrated in Fig. I.

Fig. IV is an enlarged fragmentary view, certain parts being broken away, of indicating mechanism employed in the scale illustrated in Fig. I.

Fig. V is a horizontal sectional view, taken substantially from the position indicated by the line V—V of Fig. IV.

Fig. VI is a vertical sectional view, taken substantially from the position indicated by the line VI—VI of Fig. IV.

Fig. VII is a fragmentary detailed view of a portion of the mechanism shown in Fig. IV.

Fig. VIII is a detailed sectional view, taken from the line VIII—VIII of Fig. VII.

These specific drawings and the specific description that follows merely disclose and illustrate the invention and are not intended to impose limitations upon the claims.

A load receiving platter 10 is mounted on levers (not shown) which are enclosed in a base 11 at the rear of which there is located an upwardly extending column 12. A vertical pull rod 13 (Fig. II) is connected to the levers and extends upwardly through the column 12 into the interior of a dial housing 14 mounted atop the column. The upper end of the pull rod 13 is connected to a pair of flexible metallic ribbons 15 which are attached to a pair of load counterbalancing pendulums 16. When a load is placed upon the platter 10, the rod 13 is pulled downwardly which, through the medium of its connection to the pendulums 16 and their mounting on a frame 17 located within the housing 14, causes the pendulums to swing outwardly and move upwardly to counterbalance the load. A compensating bar 18 (see also Fig. VI) is pivotally connected to the pendulum 16 and carries a resiliently mounted rack 19 which is engaged with a pinion 20 pinned on a horizontal indicator shaft 21 journaled in the frame 17. A light thin disk 22 is secured on the forward end of the indicator shaft 21. Thus, when the pendulums are swung outwardly under influence of a load on the platter 10, the compensating bar 18 and rack 19 move upwardly rotating the pinion 20, indicator shaft 21 and disk 22 in a clockwise direction.

A series of indicia 23 is printed on the surface of the disk 22 near its edge and is visible through an opening 24 in a front cover 25 of the housing 14. A lens 26 (Fig. V) is mounted in the front of the opening 24 and magnifies the indicia 23 and an indicator 27 which cooperates therewith to indicate the weight of commodities placed upon the platter 10.

Inscribed upon the disk 22 are three curved lines 28, 29 and 30 which pass, in overlapping sequence, behind a vertical slot 31 cut through a plate 32 located just in front of the disk 22 and behind a vertical windowed opening 33 in the cover 25. These lines are so curved and proportioned that when the chart disk 22 is rotated in a clockwise direction the lines appear to move downwardly behind the opening 31. These lines are so curved that the vertical distance through which they appear to move is directly proportional to the percentage change in weight causing such movement, i. e., if the weight of a load on the scale is increased from 8 pounds to 9 pounds (12½%), the curved line 29 will appear to move downwardly the same distance as it would if the load on the scale were increased from 12 pounds to 13½ pounds (12½%). The lines 28 and 30 are similarly inscribed, covering different ranges of weight. The curved line 28 is so located on the chart that its outer end appears at the upper end of the slot 31 when the load on the platform equals 7½ pounds and its inner end passes from view beneath the slot 31 when the load on the scale increases over 15 pounds. The outer end of the curved line 29 appears at the upper end of the slot 31 when the load on the platform is 10 pounds and its inner end disappears beneath the slot 31 when the load reaches 20 pounds. The outer end of the line 30 appears at the upper end of the slot 31 when the load on the platform weighs 15 pounds and its inner end reaches the bottom of the slot 31 when the load on the platter reaches 30 pounds (the maximum capacity of the scale). All three of these lines appear to move downwardly the same distance for equal percentage increases in weight on the scale.

A bracket 34 is mounted within the housing 14 and rotatably journals the lower end of a vertically extending shaft 35, the upper end of which is journaled in a similar bracket 36. Collars 37 and 38 are secured to the shaft 35 outside the brackets 34 and 36 to prevent the shaft from moving vertically. A U shaped frame 39 is vertically slidable on the shaft 35 and is connected by means of a Bowden wire cable 40 to a lever 41 (Fig. I) which extends outside the base 11. An upper horizontal pointer 42 is riveted to the U shaped frame 39 near its upper end extending horizontally through a slot 43 in the side wall of the plate 32 and into the slot 31 over the surface of the chart disk 22. The outermost end of the pointer 42 has the same width as the lines 28, 29 and 30 with which it is designed to cooperate.

A second U shaped frame 44 is also slidably mounted on the shaft 35, its lower arm being located between the arms of the U shaped frame 39. A lower pointer 45 is riveted to the lower arm of the frame 44. The right end of the pointer 45 extends through the slot 43 and into the slot 31 at a point beneath the pointer 42.

The cross arm of the U shaped frame 44 has a set of rack teeth 46 cut in the forward edge thereof which are engaged by a pinion 47 (see also Fig. VIII). The pinion 47 is integral with the hub of a bevel gear 48. The pinion 47 and gear 48 are journaled on a horizontal pin 49 which is a portion of an elbow 50 slidably mounted on the shaft 35 between the lower arm of the U shaped frame 44 and the upper arm of the U shaped frame 39 and riveted to the U shaped frame 39 (Fig. VIII). The bevel gear 48 is in mesh with a similar bevel gear 51 which is keyed to the shaft 35 and vertically slidable on the shaft, being maintained in driving relation with the shaft by the engagement of its key in a long keyway 52 cut in the shaft 35. The bevel gear 51 is vertically moved by being located between the upper arm of the U shaped frame 39 and the elbow 50 which is riveted to the frame 39. A bevel gear 53 is pinned on the shaft 35 near its lower end and is in mesh with a bevel gear 54 which is located on the inner end of a sleeve 55 extending out through the cover 25 and journaled on a stud shaft 56 secured to the bracket 34. An indicator knob 57 (see also Fig. III) is secured on the sleeve 55 and carries an indicator 58 which cooperates with a series of percentage indicia 59 inscribed on a plate 60 secured to the cover 25. By turning the indicator knob 57, the shaft 35 is rotated which in turn rotates the gears 51 and 48 and the pinion 47 and, through the medium of the rack teeth 46, moves the U shaped frame 44 with respect to the U shaped frame 39. When the indicator 58 points to any one of the indicia 59, the U shaped frames 39 and 44 are so positioned with respect to each other that the upper and lower pointers 42 and 45 respectively are spaced a distance apart equal to the distance which one of the lines 28, 29 or 30 appears to move under an increase in weight of a load on the platter 10 corresponding in percentage of increase to that one of the indicia 59 with which the indicator 58 is in registration.

A third horizontal pointer 61 (Figs. IV and VII) also extends through the slot 43 and into the slot 31, and is located between the upper and lower pointers 42 and 45. The pointer 61 has an upright section through which a slot 62 is cut, and a lower foot 63 which is angularly cut at its lower end. The pointer 61 is vertically slidable on a pair of rivets 64 which are secured to the upper pointer 42 and extend through the slot 62 in the pointer 61. A proportioning link 65 is pivoted in an ear 66 at the lower end of the U shaped frame 44 and pivotally connected to a second link 67 which is pivotally attached to the upper pointer 42. The lower angularly cut end 63 of the pointer 61 rests on a pin 68 which extends from the proportioning link 65.

When the lower pointer 45 is moved with respect to the upper pointer 42, the proportioning link 65 is pivoted at its connection point with the link 67 and raises or lowers the center pointer 61 proportionately to the movement of the lower pointer 45. In the embodiment shown, the pin 68 is located approximately ⅗ of the distance from the connection between the proportioning link 65 and the link 67 and the connection between the link 65 and the ear 66. Thus the pointer 61 is maintained ⅗ of the distance between the upper pointer 42 and the lower pointer 45.

The operation of the device is as follows: A ham is placed upon the platter 10 which, through the medium of the load counterbalancing mechanism, rotates the disk chart 22 until the weight of the ham is counterbalanced (for example, in Fig. IV the mechanism is shown in the position it would assume if a ham weighing 13 pounds 7 ounces were on the platter 10). By means of the lever 41, the percentage indicating mechanism comprising the three pointers 42, 61 and 45 and their associated linkage, is raised or lowered until the upper pointer 42 is in line with that one of the lines 28, 29 or 30 which is visible through the slot 31 (in Fig. IV, two of the lines are thus visible and when this is the case the upper pointer 42 is aligned with the uppermost one of the visible lines). The indicator knob 57 is then turned to point to the predetermined percentage by weight of brine which it is desired to inject into the blood vessels of the ham being processed. This moves the lower pointer 45 until the space between the upper pointer 42 and the lower pointer 45 is equal to the distance which the indicator line will move downwardly upon the addition of the predetermined percentage of brine. Through the medium of the proportioning link 65, the pointer 61 is moved to a position ⅗ of the way between the upper and lower pointers away from the upper pointer.

The pumping needle is inserted into the blood vessels leading to the cushion side of the ham and curing fluid is pumped into these vessels until the indicating line which appears to move downwardly coincides with the end of the middle pointer 61. The needle is then transferred to the blood vessels leading to the flank side of the ham and fluid is injected until the indicating line is in line with the lower pointer 45. Thus the total quantity of brine necessary to increase the weight of the ham by the preselected percentage is divided between the two sets of blood vessels in the proportion of 60% to the cushion side of the ham and 40% to the flank side of the ham to result in more even curing and flavor by compensating for the unequal volume of the two systems of blood vessels.

The embodiment of the invention that has been disclosed may be modified to meet various requirements.

Having described the invention, I claim:

1. In a device of the class described having a housing, a chart within said housing and movable in response to loads being weighed, an elongated opening in said housing through which said chart is visible, said chart bearing curved index lines so arranged as to appear through said opening to move through apparently equal linear distances for equal percentage changes in the weight of such load and a pair of pointers projecting into said opening for cooperation with said index lines for indicating the distance through which said lines are to be moved by increasing such load, means adjustably connecting said pointers to vary the distance between them, a third pointer differentially linked to the first mentioned pointers for dividing the distance between the first mentioned pointers in constant proportions irrespective of the total distance between said pointers.

2. In a percentage indicating weighing scale, in combination, a relatively movable chart and a pair of pointers, said chart bearing curved indicia lines so arranged as to appear to move apparently equal linear distances with respect to said pointers for equal percentage changes in the weights of loads on said scale, means to adjust one of said pointers with respect to the other of said pointers for varying the distance therebetween, and a third pointer located between the first mentioned pointers and differentially linked thereto for dividing the distance between the first mentioned pointers in constant proportions, irrespective of the total distance therebetween.

3. In a device for indicating percentage changes in weight, in combination, an index responsive to loads on said device, a pair of pointers for indicating desired limits of percentage change in weight, said index being apparently movable from a position of registration with one of said pointers to a position of registration with the other of said pointers by a change in weight of a load on said device equal in percentage to the percentage represented by the distance between said pointers, means adjustably connecting said pointers to vary such distance and a third pointer differentially connected to at least one of the first mentioned pointers for dividing the distance between the first mentioned pointers in constant proportions regardless of the distance between the first mentioned pointers.

4. In a device for indicating percentage changes in weight, in combination, an index movable in response to changes in weight, a pair of connected pointers for cooperation with said index for indicating desired limits of percentage change in weight, said index being apparently movable from registration with one of said pointers to registration with the other of said pointers by a percentage change in weight equal to the percentage change in weight represented by the distance between said pointers, manual means for changing the distance between said pointers and a third pointer differentially connected to at least one of the first mentioned pointers for dividing the distance between the first mentioned pointers in constant proportions irrespective of the total distance between the first mentioned pointers.

5. In a percentage change in weight indicating scale having an index movable in response to changes in weight of a load on said scale and a pair of pointers, means for adjustably connecting said pointers together for delineating the distance through which such index apparently is moved to indicate a desired percentage change in weight, in combination, a third pointer, and means whereby said third pointer is differentially connected to at least one of the first mentioned pointers and movable therewith for dividing the distance between the first mentioned pointers in constant proportion irrespective of the total distance therebetween.

6. In a device of the class described, in combination, a chart movable in response to loads being weighed and bearing curved index lines so arranged as to move through apparently equal linear distances with respect to a fixed indicator for equal percentage increases in the weight of such a load, a pair of pointers cooperating with the curved index lines for indicating the limits of percentage change in weight which is desired, means adjustably connecting said pointers to vary such limits and consequently the percentage change indicated, and a third pointer differentially connected to the first mentioned pointer for dividing the distance between the the first mentioned pointers in constant proportions regardless of the total distance between said pointers.

7. In a percentage change in weight indicating scale having an index movable in response to changes in weight of a load on said scale and a pair of pointers, means for adjustably connecting said pointers together for delineating the distance through which such index apparently is moved to indicate a desired percentage change in weight, in combination, a third pointer, and means to position said third pointer between the first mentioned pointers such that it divides the distance between the first mentioned pointers in constant proportion irrespective of the total distance therebetween.

LAWRENCE S. WILLIAMS.